US011960686B2

(12) United States Patent
Chappaz et al.

(10) Patent No.: US 11,960,686 B2
(45) Date of Patent: Apr. 16, 2024

(54) 3D CONTROL DEVICE WITH HAPTIC FEEDBACK

(71) Applicant: HAP2U, Saint Martin d'Hères (FR)

(72) Inventors: Cedrick Chappaz, Saint Martin d'Hères (FR); Matthieu Rupin, Saint Martin d'Hères (FR)

(73) Assignee: HAP2U, Saint Martin d'Hères (FR)

( * ) Notice: Subject to any disclaimer, the term of this patent is extended or adjusted under 35 U.S.C. 154(b) by 0 days.

(21) Appl. No.: 17/594,402

(22) PCT Filed: Apr. 24, 2020

(86) PCT No.: PCT/FR2020/000150
§ 371 (c)(1),
(2) Date: Oct. 14, 2021

(87) PCT Pub. No.: WO2020/217008
PCT Pub. Date: Oct. 29, 2020

(65) Prior Publication Data
US 2022/0171479 A1  Jun. 2, 2022

(30) Foreign Application Priority Data
Apr. 25, 2019  (FR) ...................................... 1904383

(51) Int. Cl.
*G06F 3/01* (2006.01)
*G06F 3/02* (2006.01)
(Continued)

(52) U.S. Cl.
CPC .............. *G06F 3/044* (2013.01); *G06F 3/016* (2013.01); *G06F 3/02* (2013.01); *G06F 3/0362* (2013.01)

(58) Field of Classification Search
None
See application file for complete search history.

(56) References Cited

U.S. PATENT DOCUMENTS 9,671,954 B1 6/2017 Jaugilas et al.
2008/0238879 A1* 10/2008 Jaeger ................... G06F 3/0338
345/173

(Continued)

FOREIGN PATENT DOCUMENTS

DE     102016121076 A1   5/2018
WO     2008116980 A1    10/2008

(Continued)

OTHER PUBLICATIONS

International Search Report (PCT/ISA/210) with English translation and Written Opinion (PCT/ISA/237) dated Jul. 27, 2020, by the European Patent Office as the International Searching Authority for International Application No. PCT/FR2020/000150.

*Primary Examiner* — Carl Adams
(74) *Attorney, Agent, or Firm* — BUCHANAN INGERSOLL & ROONEY PC

(57) ABSTRACT

A control device with haptic feedback includes a vibrating plate having a touch surface provided with touch sensors and capable of being vibrated at an ultrasonic frequency by electromagnetic actuators controlled by a control electronics, so as to generate an ultrasonic lubrication effect on the touch surface. A three-dimensional touch interface is fixed to and integral with the touch surface, configured to communicate vibrations of the ultrasonic lubrication effect from the touch surface to the finger of a user by means of the three-dimensional touch interface.

14 Claims, 1 Drawing Sheet

(51) Int. Cl.
*G06F 3/0362* (2013.01)
*G06F 3/044* (2006.01)

(56) References Cited

U.S. PATENT DOCUMENTS

| | | |
|---|---|---|
| 2012/0256862 A1 | 10/2012 | Wagner |
| 2016/0364059 A1* | 12/2016 | Chan ........................ G06F 3/016 |
| 2019/0278386 A1 | 9/2019 | Masthoff et al. |
| 2019/0294248 A1* | 9/2019 | Leroy .................... H02N 2/001 |
| 2021/0004555 A1* | 1/2021 | Panchawagh ........ H10N 30/302 |

FOREIGN PATENT DOCUMENTS

| | | |
|---|---|---|
| WO | 2015200726 A2 | 12/2015 |
| WO | 2018197794 A1 | 11/2018 |

* cited by examiner

[Fig. 1]
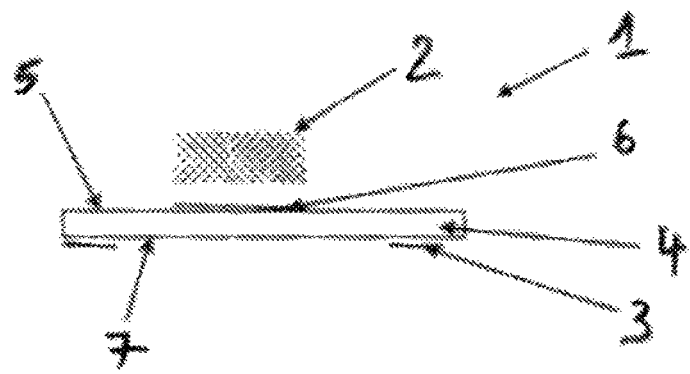
[Fig. 2]
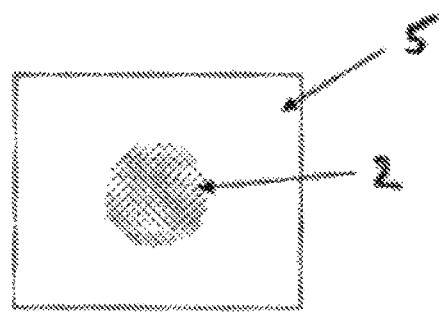
[Fig. 3]
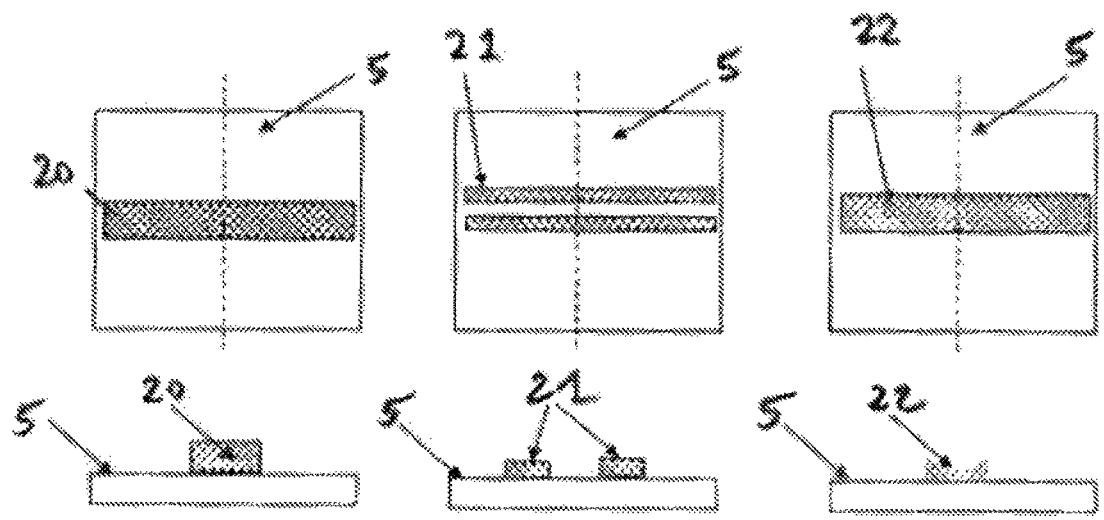

3D CONTROL DEVICE WITH HAPTIC
FEEDBACK

FIELD OF THE INVENTION

The invention relates to control interfaces with haptic feedback, for application notably, although not exclusively, in the field of industrial equipment or in the automotive field.

PRIOR ART

Manual controls currently consist mainly of various types of mechanical buttons, or 2D touchscreens associated with mechanical actuators.

Most manual control members in the field of industry, such as control knobs, buttons, slide controls, require mechanical moving parts incorporated into the object or the machine that is to be controlled, so as to allow the control member to be turned or else moved longitudinally along an axis. These manual control members such as knobs, sliding controls or the like, generally comprise a part that is able to move by virtue of a ball bearing system, a mobile rail, or a magneto-rheological fluid (material of which the rigidity is dependent on the magnetic field applied).

These known devices therefore employ mechanical moving parts which are expensive to produce and the lifespan of which is limited because of the wear associated with use, thus entailing expensive replacement or maintenance operations.

One example of such a known control member is described in document US 2019/0278386 A1 in the context of a car instrument panel. It comprises a fixed support secured to the instrument panel or to a frame fixed to the instrument panel, a rotary element affixed to the support, and a display that is electrically powered by induction. The assembly is complex and involves a large number of parts, of which several, including the display, are able to move with respect to the instrument panel. The support that takes the rotary element is not a surface that has haptic feedback and does not have an ultrasonic lubrication effect.

OBJECT OF THE INVENTION

It is a notable general object of the invention to propose a control member that is devoid of the disadvantages exhibited by the known control devices.

Another specific object of the invention is to propose a control device capable ultimately of eliminating most of the knobs and sliding controls that contain mechanical moving parts, such as ball bearings or the equivalent.

It is another object of the invention to propose a touch-based control interface with haptic feedback which is tangible, that is to say which has a three-dimensional structure that is easy for a user's digits to manipulate.

The intended control interface needs also to be interactive, which is to say capable of transmitting information to the user in the form of haptic feedback, and of taking control information from the user to transmit to the device that is to be controlled.

Another object of the invention is to propose a modifiable control member which can easily be adapted simply by programming to suit several types of device that are to be controlled.

SUMMARY OF THE INVENTION

In principle, the invention consists in proposing a three-dimensional (denoted 3D) control member associated with a surface that has haptic feedback provided with electromechanical actuators and with sensors.

The three-dimensional control member is fixed, and is secured to the surface with haptic feedback, by means of a double-sided adhesive or of a polymer glue of the epoxy type for example. The adhesive is chosen to transmit to the 3D control member an ultrasonic vibration allowing modulation of an ultrasonic lubrication effect (the effect known as the "squeeze film" effect) between the surface with haptic feedback and the 3D control member.

The subject of the invention is therefore a control device with haptic feedback, comprising a vibrating plate having a touch surface provided with touch sensors and able to be set in vibration at an ultrasonic frequency by electromechanical actuators which are controlled by control electronics so as to generate, on said touch surface, an ultrasonic lubrication effect, characterized in that it comprises a three-dimensional touch interface that is fixed, and secured to said touch surface, and configured to communicate the vibrations of the ultrasonic lubrication effect from said touch surface to the digit of a user via said three-dimensional touch interface.

In this way, the user is able to perceive the change in the ultrasonic lubrication effect directly on the very tangible raised touch interface.

According to the invention, and surprisingly, said three-dimensional touch interface is a purely passive element, devoid of any electronic component and of any moving part.

According to one embodiment, the three-dimensional touch interface is made of wood, of rigid plastic, or of metal.

According to one embodiment, the 3D touch interface is fixed to the surface by means of a rigid or soft adhesive, notably a double-sided viscoelastic adhesive or an adhesive resin.

The adhesive chosen has, for example, a Young's modulus of between 50 MPa and 5 GPa at ambient temperature, and at a vibrational frequency of between 20 kHz and 200 kHz.

The 3D touch interface may adopt a wide variety of forms, notably the form of a cylindrical, conical or frusto-conical button, or the form of a parallelepipedal fixed slide-control along which a digit of a user can move, or the form of a fixed slide-control with a double guide rail, or else the form of a concave fixed slide-control along which a digit can move.

The 3D touch interface may be produced from various materials, notably from wood, from rigid plastic, or from metal.

According to one advantageous embodiment, the electromechanical actuators which cause the touch surface to vibrate consist of piezoelectric ceramics operated at ultrasonic frequencies of between 20 kHz and 200 kHz.

According to one embodiment, the three-dimensional touch interface comprises electric wires or tracks arranged in such a way that the variation in their capacitance upon contact with a digit of a user can be detected by capacitive touch sensors incorporated into the touch surface.

DETAILED DESCRIPTION

The invention will be described in greater detail with the aid of the figures, in which:

FIG. 1 is a diagram outlining the control device according to the invention, in side view;

FIG. 2 is a diagram outlining the control device of FIG. 1, viewed from above;

FIG. 3 depicts views from above and from the side of three embodiment variants of the control device according to the invention.

Reference is made to FIG. 1. The device 1 according to the invention comprises a vibrating plate 4 having a touch surface 5 with haptic feedback, actuated by electromechanical actuators 3 at an ultrasonic vibrational frequency in order therein to set up standing Lamb waves, as known and as described for example in document WO 2008/116980 A1.

As described in the above-mentioned document, a vibrating plate 4 is actuated by a piezoelectric layer 3 fixed against the other face 7 of the vibrating plate 4, the opposite face to the touch surface 5.

Such a structure has at least one bending mode characterized by a resonant frequency of between 20 kHz and 200 kHz, and electrical supply means (not depicted) which are connected to the piezoelectric layer 3.

The piezoelectric layer 3 and the electrical supply means are designed to excite a bending mode of the vibrating touch surface 5 and generate therein standing Lamb waves with an amplitude of the order of one micron.

In the known way, the touch surface 5 is able to reproduce very fine textures or roughnesses that can be perceived by a digit, by modulating the ultrasonic lubrication effect also known as the "squeeze film" effect, by altering the coefficient of friction between the digit and the touch surface 5, thereby making it possible to modify the tactile sensation of touching the contact surface.

In certain application environments, such as, for example, those of industrial equipment or in the automotive field, it would be more practical to obtain a haptic feedback effect by modulating the squeeze film effect not of a planar touch surface but of a more conventional 3D element.

However, simply providing a planar vibrating plate 4 with a 3D projection completely modifies the vibration of the plate, and in particular eliminates the ultrasonic lubrication haptic return effect in the plate by destroying the standing Lamb wave. Thus, a uniform ultrasonic lubrication haptic return effect (one that has the same intensity at all points of the element) may potentially be generated in the 3D element by exciting a localized mode in this element, but not in the plate simultaneously. In order to remedy this, it has been found that fixing a purely passive simple three-dimensional element to the touch surface of a vibrating plate using a specific adhesive makes it possible to limit the impact that the presence of the 3D button has on the vibratory mode of the touch surface while at the same time allowing the ultrasonic vibration to be transmitted from the plate to the 3D element.

FIG. 1 depicts a diagram outlining one embodiment of the control device according to the invention, using a three-dimensional button 2 fixed to a touch surface 5 of a vibrating plate 4 (namely the upper face of the plate 4 in the example depicted) using an adhesive layer 6 interposed between the touch surface 5 and the three-dimensional button 2.

To simplify the description, the 3D touch interface 2 will be referred to as a "3D button", this in practice covering any three-dimensional fixed control member of the knob, button, sliding control or equivalent type.

The control signal for the piezoelectric actuators 3 needs to take account of the rigidity contributed by the 3D button 2 and of the viscoelastic behavior of the adhesive 6. The adhesive 6 is chosen for its mechanical properties so as to transmit the vertical movement of the rigid touch surface 5 to the 3D button without significant damping.

Compatible bondings are those achieved using double-sided adhesives or resins able to bond different materials. Examples are found in touchscreens for connecting the various layers of the display and of the touch sensor to one another. They typically have a Young's modulus of between 50 MPa and 5 GPa at ambient temperature. However, the adhesive may also be a highly rigid adhesive, for example of the epoxy type.

According to the invention, the 3D button 2 needs to be manufactured from a rigid material compatible with setting up a resonant mode of the A0 Lamb wave type: metal, glass, wood, rigid plastic, or equivalent.

The vibration of the touch surface 5 can be perceived at the surface of the 3D button 2 even in the case of a button that is entirely passive, devoid of any electronic component, of any electrical power supply, and of any moving part.

However, in order for the movement of a digit belonging to a user on the 3D button to be able to be detected by the touch surface 5 with haptic return and transmitted to the electronics of the equipment connected to the haptic surface (electronics not depicted), it is necessary for the touch surface 5 to be able to detect a signal associated with the moving of the digit on the 3D button. In that case, it may be beneficial to arrange on or in the 3D button 2 electrical wires or tracks of which the variation in capacitance can be detected by capacitive touch sensors, which may be incorporated into the touch surface 5. It is then as if the user were placing the digit directly on the touch surface 5 with haptic feedback.

The effect sought by the invention is not limited by any particular geometry of the 3D button. FIG. 3 depicts, viewed from above and viewed from the side, 3 examples of 3D buttons which reproduce the usual shapes of 3D buttons known in the prior art, namely: a button 20 in the form of a parallelepipedal bar, a double longitudinal sliding control 21, or a sliding control 22 in the form of a concave channel, able to guide the digit of the user without the latter even having to look at the device.

Advantages of the Invention

The invention achieves the desired objectives.

In particular, it makes control buttons more reliable by eliminating the mechanical moving parts thereof. It allows surfaces with haptic feedback using ultrasonic lubrication to be provided with a 3D control member which is very tangible and interactive, even though fixed with respect to the surface having haptic feedback.

The control device according to the invention also makes the design of new touch interfaces easier as the user will have merely to program the touch surface in order to be able to install the 3D button in a desired region of the touch surface.

Finally, the control device according to the invention is particularly economical to implement because it involves only the use of a rigid solid button and of an adhesive.

The invention claimed is:

1. A control device with haptic feedback, comprising a vibrating plate having a touch surface provided with touch sensors and vibrated at an ultrasonic frequency by electromechanical actuators which are controlled by control electronics so as to generate, on said touch surface, an ultrasonic lubrication effect, and further comprising a three-dimensional touch interface that is devoid of any actuator and of any moving part and is fixed and secured to said touch surface by an adhesive chosen to transmit the ultrasonic vibration generating the ultrasonic lubrication effect from said touch surface to said three-dimensional touch interface, wherein said ultrasonic lubrication effect is communicated from said touch surface to a digit of a user via said three-dimensional touch interface when said digit of the user touches or swipes said three-dimensional touch interface.

2. The control device as claimed in claim 1, wherein said three-dimensional touch interface is a passive element, devoid of any electronic component.

3. The control device as claimed in claim 2, wherein the three-dimensional touch interface is fixed to the touch surface by means of a rigid or soft adhesive.

4. The control device as claimed in claim 3, wherein the adhesive is a double-sided adhesive or an adhesive resin.

5. The control device as claimed in claim 3, wherein the adhesive has a Young's modulus of between 50 M Pa and 5 GPa at ambient temperature, and at a vibrational frequency of between 20 kHz and 200 kHz.

6. The control device as claimed in claim 1, wherein the three-dimensional touch interface is made of wood, of rigid plastic, or of metal.

7. The control device as claimed in claim 6, wherein the three-dimensional touch interface comprises electric wires or tracks arranged in such a way that variation in their capacitance upon contact with a digit of a user can be detected by capacitive touch sensors incorporated into the touch surface.

8. The control device as claimed in claim 1, wherein the adhesive is a double-sided adhesive or an adhesive resin.

9. The control device as claimed in claim 1, wherein the adhesive has a Young's modulus of between 50 MPa and 5 GPa at ambient temperature, and at a vibrational frequency of between 20 kHz and 200 kHz.

10. The control device as claimed in claim 1, wherein the three-dimensional touch interface has the form of a cylindrical, conical or frustoconical fixed button.

11. The control device as claimed in claim 1, wherein the three-dimensional touch interface has the form of a parallelepipedal fixed slide-control along which a digit of a user can move.

12. The control device as claimed in claim 1, wherein the three-dimensional touch interface has the form of a fixed slide-control with a double guide rail.

13. The control device as claimed in claim 1, wherein the three-dimensional touch interface has the form of a concave fixed slide-control along which a digit can move.

14. The control device as claimed in claim 1, wherein the electromechanical actuators comprise piezoelectric ceramics operated at ultrasonic frequencies between 20 kHz and 200 kHz.

* * * * *